Dec. 15, 1936.  W. A. SCHULZ  2,064,570
FILM DRAG APPLYING DEVICE
Filed May 27, 1931
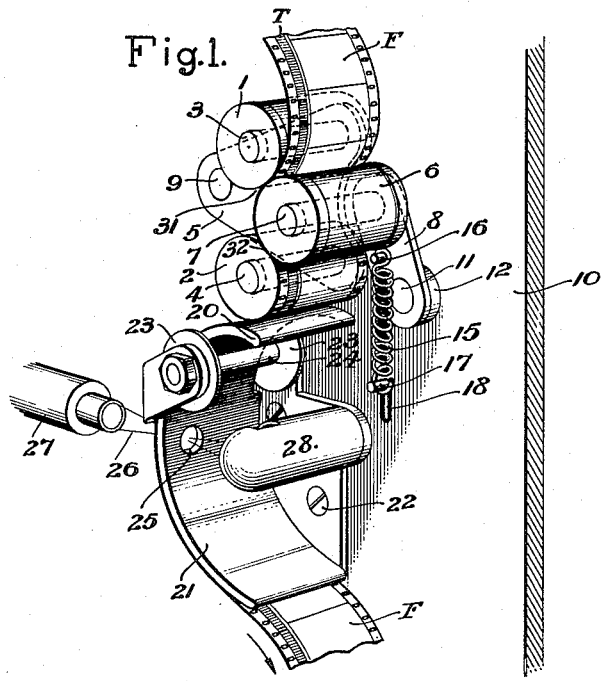
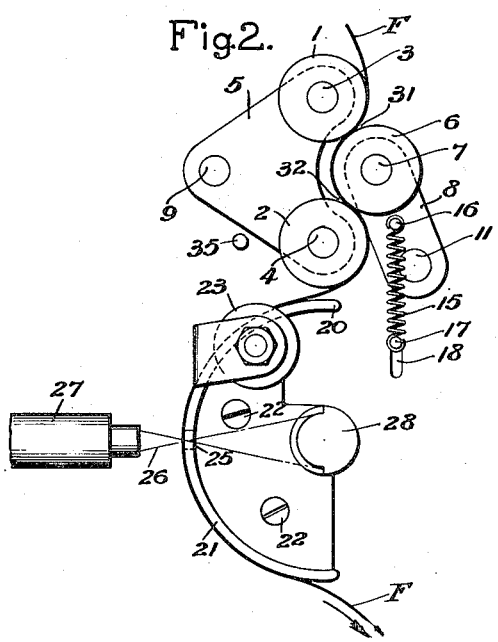
INVENTOR.
Walter A. Schulz.
BY
HIS ATTORNEY.

Patented Dec. 15, 1936

2,064,570

UNITED STATES PATENT OFFICE 2,064,570

FILM DRAG APPLYING DEVICE

Walter Albert Schulz, Oaklyn, N. J., assignor, by mesne assignments, to Radio Corporation of America, New York, N. Y., a corporation of Delaware Application May 27, 1931, Serial No. 540,369

15 Claims. (Cl. 271—2.1)

My invention relates to sound reproducing apparatus of the type employing photographic film records, and more particularly to apparatus for assisting in the proper passage of the film over a support where the sound is taken off therefrom.

In sound reproducing apparatus of the type indicated, a film bearing a sound record is passed from a feed drum or reel, over a suitable support such as a skid, drum, or aperture plate where the sound is taken off, and thence to a take-up reel onto which the film is wound. To obtain faithful reproduction of the sound, it is essential that the film move uniformly and smoothly past the opening in the aperture plate or other support; otherwise, distortion results in reproduction. Various means have been provided for drawing the film over the aperture plate with as nearly uniform velocity as possible, but such means alone is insufficient. It is necessary, in addition, to provide some means for applying a slight drag or "hold-back" force to the film, so that it will be held against the aperture plate under a slight and constant tension as it passes thereover, and so that the length of the film between the reproducing point, or the place where the light passes through the film, and the point at which the uniform speed imparting means acts will remain constant. This is important in preventing a loose span of film between the two indicated points, since such a loose span flutters and varies in length, so that while the velocity of the film as it leaves the aperture plate or other support is constant, its velocity at the reproducing point is usually not constant.

For the purpose of applying tension to the film, a number of devices have been proposed. It has been customary, for example, to tension the film by the action of a plurality of pressure shoes bearing against the film on the aperture plate, advantage being taken of the friction between the film and the shoes on the one hand, and the film and the aperture plate on the other. According to another method, the film is tensioned by being passed between two pressure rollers before it passes over the aperture plate, one of the rollers being usually spring urged toward the other. These and other ways of applying tension to the film are subject to the serious disadvantage that they do not insure a constant and even tension on the film, resulting in a comparatively uneven or somewhat jerking motion of the film past the reproducing point. This is due largely to the fact that no provision has heretofore been made, so far as I am aware, for taking care of varying thicknesses of the film such, for example, as may be due to splicing. It is a primary object of my invention, therefore, to provide a film tensioning device which will not be subject to the disadvantages present in tensioning devices previously employed.

Another object of my invention is to provide a film tensioning device particularly adapted to insure the smooth and uniform passage of the film past the point where sound is taken off therefrom by the application of a constant and uniform drag thereto.

Still another object of my invention is to provide a film tensioning device which will tension the film without the necessity of employing pressure shoes or other frictional devices directly upon the film.

A further object of my invention is to provide an improved film tensioning device which will flex the film in imparting a uniform drag thereto.

Still a further object of my invention is to provide an improved film tensioning device which will impart uniform drag to the film regardless of variations in the thickness thereof.

It is another object of my invention to provide an improved film tensioning device wherein the external forces affecting the film are at a minimum.

Still a further object of my invention is to provide an improved film tensioning device in a sound reproducing unit which can be readily adapted to existing motion picture apparatus for the combined reproduction of pictures and sound.

Still another object of my invention is to provide an improved film tensioning device which will be rugged, durable in construction and efficient in use, as well as being compact and well suited to the requirements of commercial manufacture.

In accordance with my invention, I provide a plurality of staggered and relatively yieldable or movable rollers between which the film passes prior to passing the point where sound is taken off therefrom, the rollers being so arranged as to grip the film at spaced points therealong and yield to any variations in the thickness of the film, at the same time maintaining the film suitably constrained to insure constant tension.

The novel features of my invention are set forth with particularity in the appended claims, the invention itself, however, both as to its organization and method of operation, together with additional objects and advantages thereof, being best understood from the following description of a specific embodiment when taken in connection with the accompanying drawing in which Figure 1 is a perspective view of a sound reproducing unit having my invention incorporated therein, and Figure 2 is a side elevation thereof.

Referring to the drawing wherein similar reference characters indicate corresponding parts throughout, my improved tensioning device comprises a pair of rollers 1 and 2 mounted for rotation, respectively, on the studs 3 and 4 of a bracket 5, and a roller 6 mounted for rotation on the stud 7 of a bracket 8. The bracket 5 is pivoted on a stud 9 extending from a base plate 10, while the bracket 8 is pivoted on a stud 11, also extending from the base plate 10, the two brackets 5 and 8 being, preferably, spaced from the base plate 10 by suitable means, such as washers 12, and being so positioned that, when the bracket 8 is moved toward the bracket 5 so that the roller 6 engages the rollers 1 and 2, the three rollers will be in staggered relation. A coil spring 15 is fixed at one end to a pin 16 on the bracket 8 and held at the other end by a pin 17 which may be adjustably mounted in a slot 18 of the base plate 10, whereby the tension of the spring 15 may be adjusted. The spring 15 serves as an "over-center" spring for the bracket 8 to hold the roller 6, when moved to the left of the stud 11, in contact with the rollers 1 and 2, and to positively hold the roller 6 out of contact with the rollers 1 and 2 when moved to the right of the stud 11.

The brackets 5 and 8 with their rollers 1, 2, and 6 are mounted, for a purpose appearing hereinafter, in very close proximity to one end 20 of a suitable film supporting member 21, such as a skid, aperture plate, drum, or the like, also mounted on the base plate 10, as by means of bolts 22. The film F, fed from a suitable reel or drum (not shown), is passed between the rollers 1 and 6 at their line of contact 31, wrapped partly around the roller 6 and passed between the rollers 6 and 2 at their line of contact 32, and, after being wrapped partly around the roller 2, is led from there between the guide flanges 23, 23 of a roller 24, also positioned close to the end 20 of the support or skid 21, and over the supporting member or skid 21. The film F is so located with respect to the skid 21 that the sound track T thereon is in constant alignment with an aperture 25 as the film passes over the skid, and the film F is fed from the skid with uniform speed by any suitable means (not shown). As the film passes over the skid in the manner described, the sound track T intercepts and modulates a reproducing light beam 26 focused thereon by an optical system 27, the modulated light beam then passing through the aperture 25 and subsequently falling upon a photo-electric device 28, the output of which may be connected to any suitable amplifier.

From the foregoing description, the operation of my improved tensioning device will be apparent. By mounting the rollers 1 and 2 on the pivoted bracket 5, they can easily become adjusted relative to the roller 6 to apply equal pressure thereon. Ordinarily, therefore, the film is gripped at two points, one along the contact line 31 and the other along the contact line 32. Let it be assumed now, for example, that the film has a spliced or some other thickened portion therein. When that thickened portion reaches the contact line 31, there will be a slight separation of the rollers 1 and 6 with a resulting tendency for the roller 6 to chatter, thus, ordinarily, imparting a jerking motion to the film. However, due to the contact 32 that is still maintained between the rollers 2 and 6 because of the adaptability of the roller 2 to readily adjust itself to the roller 6 by virtue of the pivotal mounting of the bracket 5, chattering of the roller 6 and slipping of the film are avoided, and a force is still applied to the film at the contact line 32 to maintain the film under constant and uniform tension. Similarly, when the thickened portion of the film has reached the contact line 32, the rollers 2 and 6 separate slightly, but now the roller 1 has readily adjusted itself to the roller 6, and again a force is applied to the film, this time along the contact line 31, to maintain a uniform and constant tension on the film. Furthermore, the staggered relation of the rollers 1, 6, and 2 causes the film F to wrap around the rollers 2 and 6 to such an extent that additional drag is imparted to the film through the friction of the bearings of these rollers, thereby further minimizing the possibility of the film slipping. The combined action of the rollers 1, 6, and 2, and the friction of the bearings should be more than adequate to accomplish the desired result, but if additional friction is desired further than that afforded by the bearings, it may be added in any suitable manner. The rollers 1 and 6 may, if desired, be equipped with rubber or felt tires, while the roller 2 should, preferably, be of metal and perfectly round.

As heretofore pointed out, the brackets 5 and 8 with their rollers 1, 2, and 6 are mounted in close proximity to the end 20 of the skid 21. This necessitates only a comparatively short length of film to be used up for the drag and makes it possible to provide a compact unit, so that it may readily be adapted to existing moving picture apparatus for the combined reproduction of pictures and sound. Because of the close proximity of the bracket 5 and roller 2 to the skid 21, I provide a pin 35 on the base plate 10 to limit the downward movement of the bracket 5 and prevent it from dropping onto the skid 21 during threading. Hence, threading of the film is facilitated despite the fact that the unit is compact.

Although I have shown and described a certain specific embodiment of my invention, I am fully aware that many modifications thereof are possible. For example, the roller 6 may be mounted on a stationary stud fixed to the base plate 10, while the spring 15 may be applied in any suitable manner to the bracket 5 to accomplish the same result that it accomplishes in the modification of my invention described above. Furthermore, although I have shown my invention as applied to a sound reproducing unit, it will be obvious that it may equally well be applied to other devices. For example, my invention may be employed with equal success in a moving picture projector wherein the film, instead of being moved intermittently through the picture gate, is moved uniformly therethrough, as in the case of continuous motion projectors. My invention, therefore, is not to be restricted except insofar as is necessitated by the prior art and by the spirit of the appended claims.

I claim as my invention:

1. In a film tensioning device, a pair of individually and relatively movable supports and a plurality of rollers mounted on said supports in staggered relation, said rollers being adapted to receive a film therebetween and grip the film at more than one point.

2. In a film tensioning device, a pair of individually and relatively movable supports and a plurality of rollers mounted on said supports in staggered relation, said rollers being adapted to receive a film therebetween and contact therewith on opposite sides thereof to flex the film.

3. In a film tensioning device, a pair of individually and relatively movable supports and a plurality of rollers mounted on said supports in staggered relation, said rollers being adapted to receive a film therebetween to engage the film at more than one point and to contact therewith on opposite sides thereof to flex the film.

4. In a film tensioning device, a pair of pivotally mounted supports, each movable relative to the other, and a plurality of rollers mounted on said supports in staggered relation, said rollers being adapted to receive a film therebetween and grip the film at more than one point.

5. In a film tensioning device, a pair of rollers fixed relative to each other and a third roller mounted for lineal movement relative to said fixed rollers, said rollers being adapted to receive the film therebetween to flex the same, and means adapted to maintain said third roller in contact with said film and to press said film against at least one of said pair of rollers.

6. In a film tensioning device, a pair of rollers fixed relative to each other and a third roller mounted for lineal movement relative to said fixed rollers, said rollers being adapted to receive the film therebetween and to flex the same, and means urging said rollers into contacting relationship to constantly maintain said film gripped between said third roller and at least one of said fixed rollers.

7. In a film tensioning device, a pair of rollers fixed relative to each other and a third roller mounted for lineal movement relative to said fixed rollers, said rollers being adapted to receive the film therebetween and to flex the same, and means urging said third roller toward said fixed rollers to constantly maintain said film gripped between said third roller and at least one of said fixed rollers.

8. In a film tensioning device, a pivotally mounted bracket, a pair of rollers mounted on said bracket in spaced relation to each other, a third roller pivotally mounted for movement toward and away from said first-named rollers, and means adapted to urge said third roller into contacting relation with each of said pair of rollers, whereby, upon pivotal movement of said bracket, at least one of said pair of rollers is brought into engagement with said third roller.

9. In a film tensioning device, a pivotally mounted bracket, a pair of rollers mounted on said bracket in spaced relation to each other, a third roller pivotally mounted on a different axis than the pivotal axis of said bracket for movement toward and away from said first named rollers, and means adapted to urge said third roller into contacting relation with each of said pair of rollers, whereby, upon pivotal movement of said bracket, at least one of said pair of rollers is brought into engagement with said third roller.

10. In combination, a film support and film drag applying means, said means being disposed in close proximity to said film support and comprising a pair of individually and relatively movable supports and a plurality of staggered rollers mounted on said supports.

11. In combination, a film support and film drag applying means, said means being disposed in close proximity to said film support and comprising a pair of pivoted supports and a plurality of staggered rollers mounted on said supports.

12. In combination, a film support and film drag applying means, said means comprising a pair of rollers fixed relative to each other and adapted to engage one side of a film, and a third roller movable relative to said fixed rollers and adapted to engage the other side of said film to flex the same, said rollers being all mounted in close proximity to one end of said support, and means for maintaining said film constantly gripped between said third roller and at least one of said relatively fixed rollers, whereby said film is tensioned as it passes over said support.

13. In combination, a film support and film drag applying means, said means comprising a bracket mounted in close proximity to one end of said support, a pair of rollers mounted on said bracket and adapted to engage one side of a film, a relatively movable roller pivotally mounted in close proximity to the same end of said support for movement toward and away from said pair of rollers and adapted to engage the other side of said film, and means for maintaining said film constantly gripped between said relatively movable roller and at least one of said fixed rollers, whereby said film is tensioned as it passes over said support.

14. The method of applying drag to a moving film upon which an operation is performed at an operating station which comprises gripping said film at a plurality of spaced points in advance of said station and maintaining said film always gripped at one or more of said points.

15. The method of applying drag to a moving film upon which an operation is performed at an operating station which comprises gripping said film at a plurality of spaced points in advance of said station and maintaining said film always but variably gripped at one or more of said points.

WALTER ALBERT SCHULZ.